(12) United States Patent
Park et al.

(10) Patent No.: US 9,476,470 B2
(45) Date of Patent: Oct. 25, 2016

(54) ELECTRO-MECHANICAL BRAKE

(71) Applicant: Daegu Gyeongbuk Institute of Science and Technology, Daegu (KR)

(72) Inventors: Tae Sang Park, Daegu (KR); Dong Hwan Shin, Daegu (KR); Choong Pyo Jeong, Daegu (KR); Sung Ho Jin, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 12 days.

(21) Appl. No.: 14/557,522

(22) Filed: Dec. 2, 2014

(65) Prior Publication Data
US 2015/0354651 A1   Dec. 10, 2015

(30) Foreign Application Priority Data

Jun. 9, 2014 (KR) .................. 10-2014-0069211

(51) Int. Cl.
| | |
|---|---|
| F16D 65/18 | (2006.01) |
| F16D 55/225 | (2006.01) |
| B60T 13/74 | (2006.01) |
| F16D 55/228 | (2006.01) |
| F16D 125/52 | (2012.01) |
| F16D 125/40 | (2012.01) |
| F16D 121/24 | (2012.01) |
| F16D 125/48 | (2012.01) |
| F16D 125/54 | (2012.01) |

(52) U.S. Cl.
CPC ............. *F16D 65/18* (2013.01); *B60T 13/741* (2013.01); *F16D 55/225* (2013.01); *F16D 55/228* (2013.01); *F16D 2121/24* (2013.01); *F16D 2125/40* (2013.01); *F16D 2125/48* (2013.01); *F16D 2125/52* (2013.01); *F16D 2125/54* (2013.01)

(58) Field of Classification Search
CPC .... F16D 65/14; F16D 65/18; F16D 2121/24; F16D 2125/40; F16H 48/08
See application file for complete search history.

(56) References Cited

U.S. PATENT DOCUMENTS 5,769,189 A * 6/1998 Heibel .................. B60T 11/046
188/106 P (Continued)

FOREIGN PATENT DOCUMENTS

| | | |
|---|---|---|
| JP | 200952682 A * | 3/2009 |
| KR | 10-1443539 B1 | 9/2014 |

OTHER PUBLICATIONS

T.S. Park et al., "Design of operating mechanism for electro-mechanical brake", Proceedings of KSPE 2014 Spring Conference, May 14-16, 2014, 2 pgs.

*Primary Examiner* — Bradley King
(74) *Attorney, Agent, or Firm* — Sughrue Mion, PLLC

(57) ABSTRACT

Provided is an electro-mechanical brake (EMB) including a driving unit configured to generate rotational force by power selectively applied as a user operates a brake pedal, a differential gear unit including a first shaft and a second shaft disposed to be aligned to form rotational shafts and rotate in the same direction by rotational force from the driving unit, a first pad disposed on one side of a brake disk, a second pad disposed on the other side of the disk, a first braking unit configured to enable the first pad to be brought into contact with one side of the disk according to a rotation of the first shaft to generate braking force, and a second braking unit configured to enable the second pad to be brought into contact with the other side of the disk according to a rotation of the second shaft to generate braking force.

12 Claims, 6 Drawing Sheets

(56) References Cited

U.S. PATENT DOCUMENTS

| | | | | |
|---|---|---|---|---|
| 2009/0294224 A1* | 12/2009 | Sakashita | ............... | F16D 65/183 188/72.2 |
| 2014/0034432 A1* | 2/2014 | Bull | ..................... | B60T 13/741 188/106 R |
| 2015/0129371 A1* | 5/2015 | Gutelius | ................. | F16D 65/18 188/72.6 |
| 2015/0144438 A1* | 5/2015 | Park | ........................ | F16D 65/18 188/72.1 |
| 2015/0204402 A1* | 7/2015 | Gutelius | ................. | F16D 65/14 188/162 |

* cited by examiner

ELECTRO-MECHANICAL BRAKE

CROSS-REFERENCE TO RELATED APPLICATION

This application claims priority under 35 U.S.C. §119 to Korean Patent Application No. 10-2014-0069211, filed on Jun. 9, 2014, the disclosure of which is incorporated herein by reference in its entirety.

TECHNICAL FIELD

The present invention relates to an electro-mechanical brake and, more particularly, to an electro-mechanical brake that generates braking force of a rotary disk by an electric driving unit.

BACKGROUND

In general, a brake is known to serve to convert kinetic energy of a running vehicle into thermal energy by mechanical friction of a friction material and dissipate the converted thermal energy in the air and decelerate or stop the vehicle.

In a driving scheme of generating mechanical friction, a hydraulic caliper including a hydraulic cylinder and a piston is largely used in vehicles, and here, force applied to step on a brake pedal by a driver is amplified by a hydraulic booster, and the amplified hydraulic pressure is delivered to a hydraulic caliper (having a large sectional area) installed in each wheel through a master cylinder (having a small sectional area) and an oil pipe.

Consequently, force equivalent to the product of hydraulic pressure delivered to a slave cylinder of the caliper and the sectional area of the caliper cylinder pushes the piston, and the piston moves pads toward a disk to make the pads brought into contact with the disk, and subsequently generates great clamping force.

Eventually, force equivalent to the product of the clamping force and a coefficient of friction of a contact surface of the disk exerts as braking force on the disk, and resultantly, small pedal force is converted into great clamping force so as to be used to perform braking.

Types of hydraulic disk brake systems are classified as a floating type disk brake system, a fixed caliper type disk brake system, and a floating caliper type disk brake system.

Thereamong, the floating caliper type disk brake system is commonly used.

The floating caliper type brake system has a structure in which a hydraulic piston pressing unit moves one inner pad to a disk and make the pad clamped to the disk and a caliper housing slides in the opposite direction of the movement of the inner pad by reaction force since then to pull an outer pad toward the disk to clamp both sides of the rotary disk to brake the disk.

Since the floating caliper type brake system has a small number of components, is light in weight, and has an excellent cooling operation, the floating caliper type brake system is used in most automobiles. However, at an initial braking stage, since the inner pad is first clamped all the time and the outer pad is subsequently operated upon receiving the reaction force, wear variations may be generated.

Also, until before the outer pad is clamped, braking force at the initial braking operation is inadequate.

In line with an alteration to hybrid, fuel cell, electric vehicles as future automobiles and demand for vehicle safety and environment-friendliness, the necessity for electro-mechanical brake (EMB) employing an electric motor, in the place of an existing hydraulic brake, to brake wheels has emerged, for which, thus, various EMB products have been developed.

Referring to a structure of an EMB product, it has a mechanism, eliminating a hydraulic driving unit (hydraulic cylinder or piston) for pressing pads in an existing hydraulic disk brake, a motor driving unit (a motor, a roller screw, a decelerator, etc.) is used instead and a rotary disk is braked by using a motor as a power source.

This mechanism is similar to that of a floating caliper type of a hydraulic disk brake.

Namely, using a motor as a power source, an inner pad is first moved and clamped, and a sliding caliper is moved by reaction force since then, to clamp an outer pad, thus performing braking.

Thus, the related art EMB product still involves the generation of wear variations between the inner pad and the outer pad, namely, the shortcomings of the floating caliper type remain unsolved, and due to the operational principle (after the inner pad is moved and clamped, the caliper is moved by reaction force to clamp the outer pad), it takes more time to reach required braking force, compared with a fixed type, degrading responsiveness.

SUMMARY

Accordingly, the present invention provides an electro-mechanical brake in which pads disposed on both sides of a disk are substantially simultaneously clamped to the disk to minimize wear variations between both sides of the disk and enhance responsiveness in a brake operation.

In one general aspect, an electro-mechanical brake (EMB) includes: a driving unit configured to generate rotational force by power selectively applied as a user operates a brake pedal; a differential gear unit connected to the driving unit and including a first shaft and a second shaft disposed to be aligned to form rotational shafts and rotate in the same direction by rotational force from the driving unit; a first pad disposed on one side of a brake disk; a second pad disposed on the other side of the disk; a first braking unit connected to the first shaft in one end thereof and connected to the first pad in the other end thereof and configured to enable the first pad to be brought into contact with one side of the disk according to a rotation of the first shaft to generate braking force; and a second braking unit connected to the second shaft in one end thereof and connected to the second pad in the other end thereof and configured to enable the second pad to be brought into contact with the other side of the disk according to a rotation of the second shaft to generate braking force.

The driving unit may be configured as a driving motor having a driving gear coupled to a rotational shaft, and the differential gear unit may include: a ring gear rotated in mesh with the driving gear; a differential case coupled to one side of the ring gear and rotated together with the ring gear; a first shaft penetrating through the differential case; a second shaft penetrating through the ring gear and aligned with the first shaft; a pair of side gears disposed to face each other and coupled to one end of the first shaft and the other end of the second shaft, respectively, within the differential case; a pair of differential pinions engaged with the pair of side gears perpendicularly and disposed to face each other within the differential case; and a first driven gear coupled to one end of the second shaft, wherein when the driving motor rotates, the first shaft and the second shaft are rotated in the same direction according to rotations of the ring gear and the differential case.

The first braking unit may be disposed in a direction parallel to the first shaft and varied in length in a length direction of the first shaft according to a rotation of the first shaft, and the second braking unit may be disposed in a direction parallel to the second shaft and varied in length in a length direction of the second shaft according to a rotation of the second shaft.

The first braking unit may include a first screw unit connected to the first shaft in one end thereof and having a thread formed on an outer circumferential surface of the other end thereof; and a first nut unit screw-coupled to the first screw unit and connected to the first pad, wherein the first pad coupled to the first nut unit linearly moves in a direction toward the disk according to a rotation of the first screw unit by the first shaft.

The second braking unit may include: a second driven gear engaged with the first driven gear coupled to the second shaft so as to be connected to the second shaft; a second screw unit coupled to the second driven gear in one end thereof and having a thread formed on an outer circumferential surface of the other end thereof; and a second nut unit screw-coupled to the second screw unit and connected to the second pad by a caliper, wherein the second pad coupled to the second nut unit linearly moves in a direction toward the disk according to a rotation of the second screw unit by the second shaft.

The first braking unit, with a length increasing, may move the first pad in the direction toward the disk, and the second braking unit, with a length decreasing, may move the second pad in the direction toward the disk.

The first pad and the second pad may simultaneously be brought into contact with the disk according to operations of the first braking unit and the second braking unit based on a rotation of the differential gear unit.

The threads of the first screw unit and the second screw unit may be formed in the same direction.

A direction change gear may be disposed between the first driven gear and the second driven gear, and the threads of the first screw unit and the second screw unit may be formed in the opposite directions.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

Figure 1:
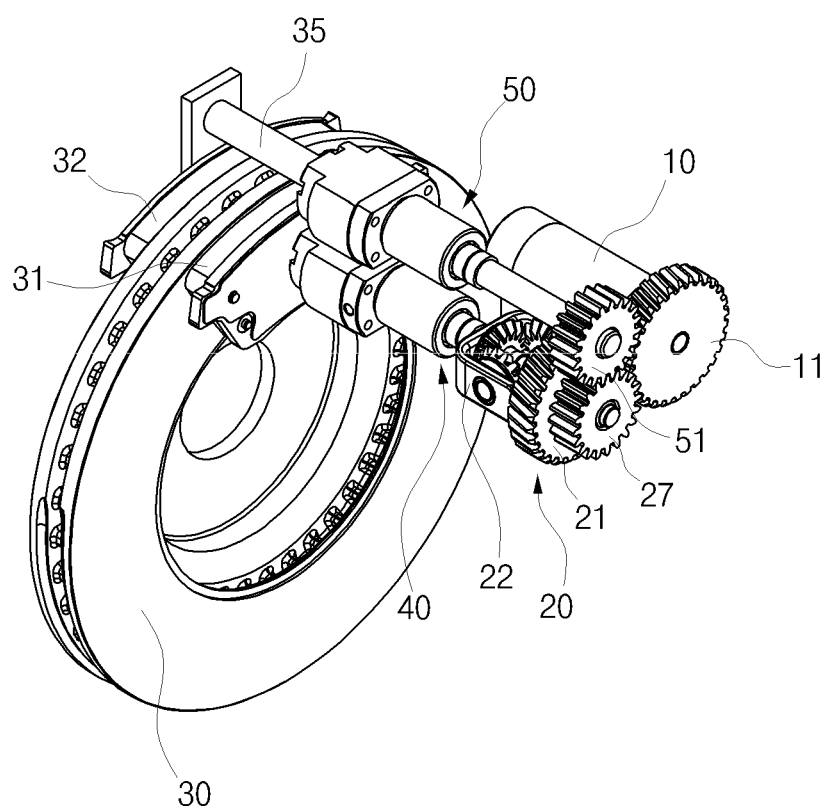
FIG. 1 is a perspective view of an electro-mechanical brake (EMB) according to an embodiment of the present invention.
Figure 2:
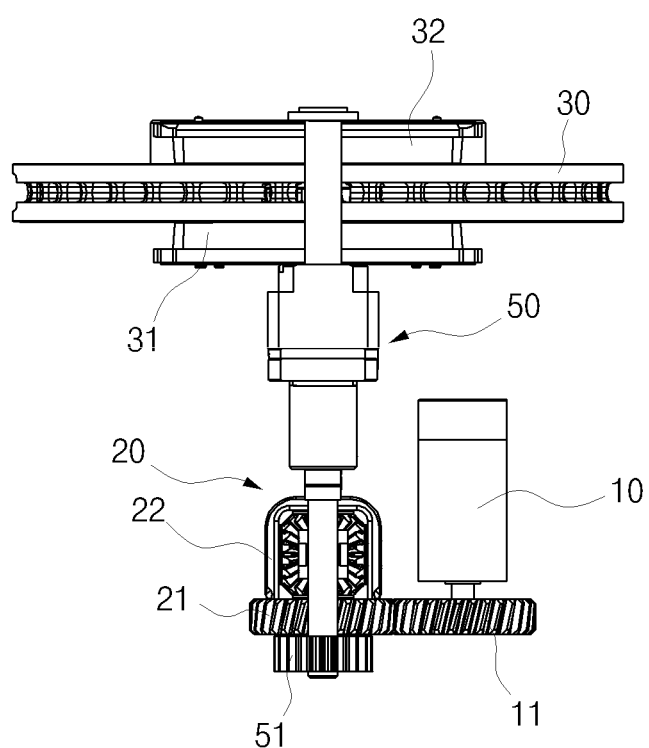
FIG. 2 is a plan view of the EMB according to an embodiment of the present invention.
Figure 3:
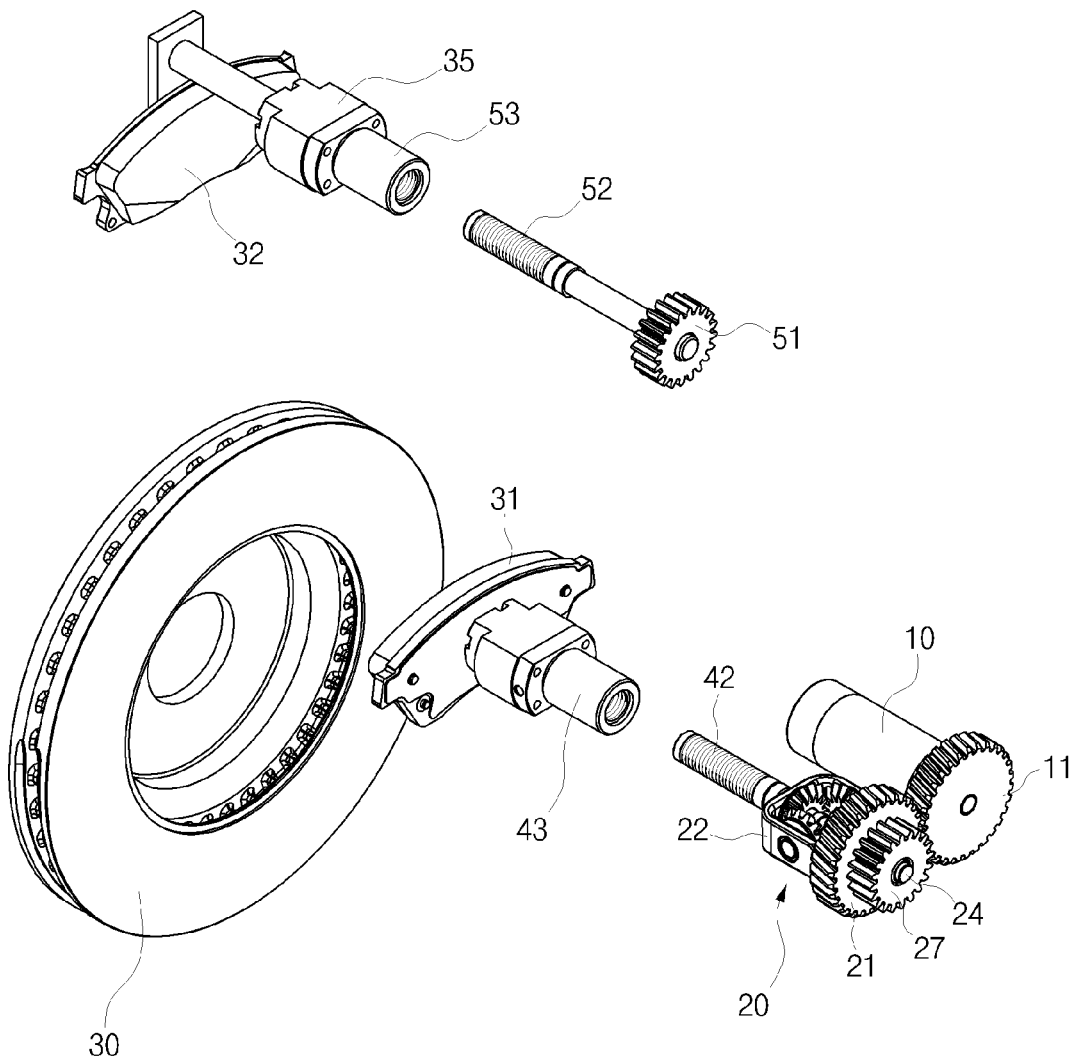
FIG. 3 is an exploded perspective view of the EMB according to an embodiment of the present invention.
Figure 4:
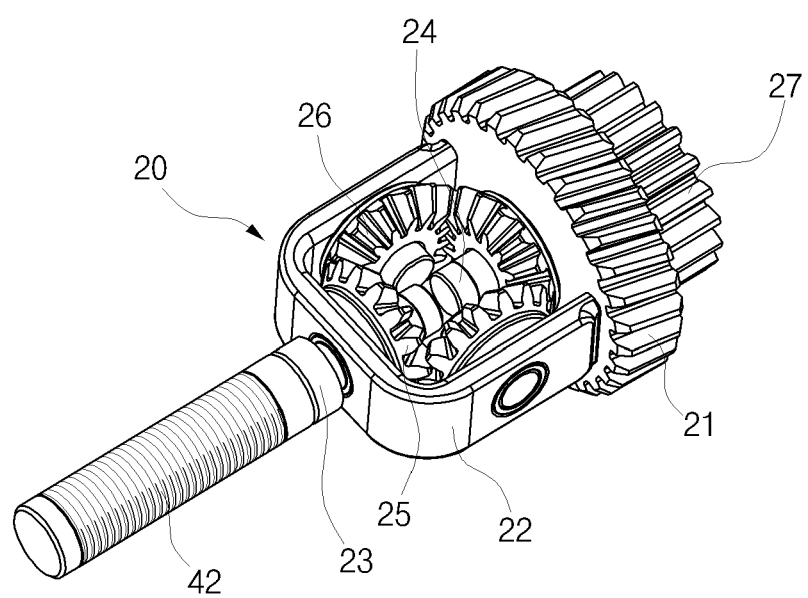
FIG. 4 is a perspective view of a differential gear unit of the EMB according to an embodiment of the present invention.
Figure 5:
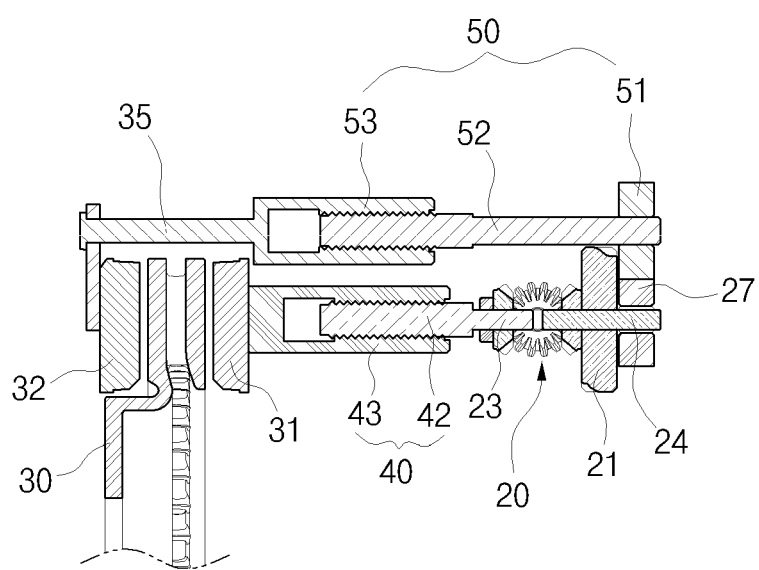
FIG. 5 is a cross-sectional view taken along line A-A' of FIG. 1.
Figure 6:
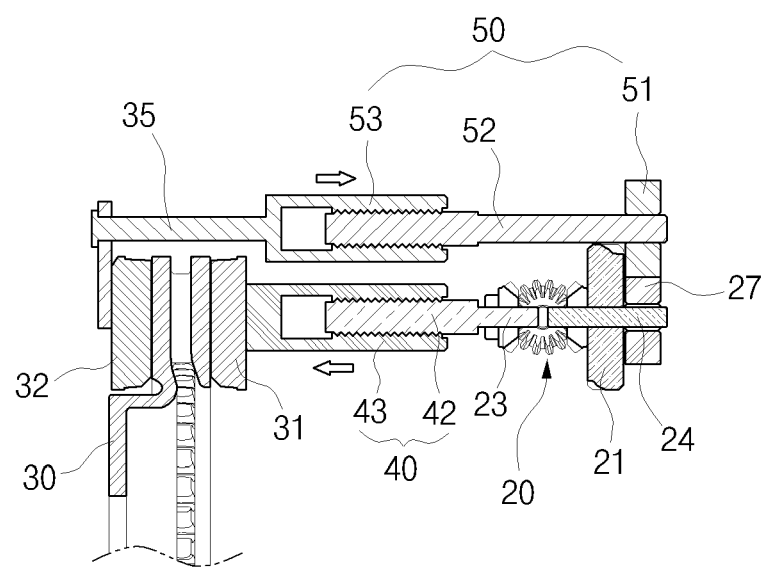
FIG. 6 is a cross-sectional view illustrating a state in which a first braking unit and a second braking unit are operated by a driving unit in FIG. 5.

FIG. 1 is a perspective view of an electro-mechanical brake (EMB) according to an embodiment of the present invention. FIG. 2 is a plan view of the EMB according to an embodiment of the present invention. FIG. 3 is an exploded perspective view of the EMB according to an embodiment of the present invention. FIG. 4 is a perspective view of a differential gear unit of the EMB according to an embodiment of the present invention. FIG. 5 is a cross-sectional view taken along line A-A' of FIG. 1. FIG. 6 is a cross-sectional view illustrating a state in which a first braking unit and a second braking unit are operated by a driving unit in FIG. 5.

As illustrated in FIGS. 1 through 6, an electro-mechanical brake (EMB) according to an embodiment of the present invention includes a driving unit 10, a differential gear unit 20, a first pad 31, a second pad 32, a first braking unit 40, and a second braking unit 50.

The driving unit 10 generates rotational force by power selectively applied as a user operates a brake pedal.

In the present embodiment, the driving unit 10 is configured as a driving motor including a driving gear 11 coupled to a rotational shaft.

According to circumstances, the driving unit 10 may further include a decelerator coupled to the driving gear 11.

The differential gear unit 20 is connected to the driving unit 10 and rotate by rotational force from the driving unit 10.

The differential gear unit 20 includes a ring gear 21, a differential case 22, a first shaft 23, a second shaft 24, a side gear 25, a differential pinion 26, and a first driven gear 27.

The ring gear 21 is engaged with the driving gear 11 so as to rotate.

The differential case 21 has a channel ("⊂") shape and both ends thereof are integrally coupled to one side of the ring gear 21.

Thus, the differential case 22 is rotated together with the ring gear 21.

An empty space is formed between the differential case 22 and the ring gear 21, in which the side gear 25 and the differential pinion 26 are insertedly disposed.

The first shaft 23 is installed to penetrate through the differential case 22.

The second shaft 24 is installed to penetrate through the ring gear 21 and is aligned with the first shaft 23.

The side gear 25 is formed as a pair of side gears disposed to face each other within the differential case 22, and coupled to one end of the first shaft 23 and the other end of the second shaft 24, respectively.

The differential pinion 26 is formed as a pair of differential pinions disposed to face each other within the differential case 22 and disposed to be engaged with the side gears 25 perpendicularly.

The first driven gear 27 is coupled to one end of the second shaft 24.

The foregoing differential gear unit 20 has a structure identical to that of a general differential gear device and an operation thereof is also identical to that of the general differential gear device, and thus, descriptions of the operation of the differential gear unit 20 will be omitted.

When the driving unit 10 rotates, the ring gear 21 and the differential case 22 of the differential gear unit 20 are rotated by rotational force of the driving unit 10, and accordingly, the first shaft 23 and the second shaft 24 disposed in a line to form rotational shafts are rotated in the same direction.

A first pad 31 is disposed on one side of a brake disk 30, and the second pad 32 is disposed on the other side of the brake disk 30.

The first braking unit 40 is connected to the first shaft 23 in one end thereof and connected to the first pad 31 in the other end thereof.

According to a rotation of the first shaft 23, the first braking unit 40 enables the first pad 31 to be moved in a direction toward one side of the disk 30 so as to be brought into contact therewith, thus generating braking force in the disk 30.

In the present embodiment, the first braking unit 40 is disposed in a direction parallel to the first shaft 23 and installed to have a length varied in a length direction of the first shaft 23 according to a rotation of the first shaft 23.

To this end, the first braking unit 40 includes a first screw unit 42 and a first nut unit 43.

The first screw unit 42 is connected to the first shaft 23 in one end thereof and has a thread formed on an outer circumferential surface of the other end thereof.

As in the present embodiment, the first screw unit 42 may be integrally connected to the first shaft 23 and may be rotated together with the first shaft 23 according to a rotation of the first shaft 23.

The first nut unit 43 is screw-coupled with the first screw unit 42, and connected to the first pad 31.

Thus, according to a rotation of the first screw unit 42 by the first shaft 23, the first nut unit 43 is linearly moved, and accordingly, the first pad 31 coupled to the first nut unit 43 is linearly moved in a direction toward the disk 30.

The second braking unit 50 is connected to the second shaft 24 in one end thereof and connected to the second pad 32 in the other end thereof.

The second braking unit moves the second pad 32 in a direction toward the other side of the disk 30 and make the second pad 32 brought into contact therewith, thus generating braking force on the disk 30.

In the present embodiment, the second braking unit 50 is disposed in a direction parallel to the second shaft 24 and installed such that a length thereof is varied in a length direction of the second shaft 24 according to a rotation of the second shaft 24.

To this end, the second braking unit 50 includes a second driven gear 51, a second screw unit 52, and a second nut unit 53.

The second driven gear 51 is engaged with the first driven gear 27 coupled to the second shaft 24, connecting the second braking unit 50 to the second shaft 24.

The second screw unit 52 is coupled to the second driven gear 51 in one end and has a thread formed on an outer circumferential surface on the other end thereof.

The second screw unit 52 rotates together with the second shaft 22 by the first driven gear 27 and the second driven gear 51 when the second shaft 24 rotates.

The second nut unit 53 is screw-coupled to the second screw unit 52 and connected to the second pad 32 by means of the caliper 35.

Thus, the second nut unit 53 linearly moves according to a rotation of the second screw unit 52 by the second shaft 24, and accordingly, the second pad 32 coupled to the second nut unit 53 linearly moves in a direction toward the disk 30.

Here, the first pad 31 and the second pad 32 are simultaneously brought into contact with the disk 30 according to operations of the first braking unit 40 and the second braking unit 50 based on a rotation of the differential gear unit 20.

In the drawing, the caliper 35 is briefly illustrated.

Hereinafter, an operational process of the present invention having the foregoing configuration will be described.

When the user does not step on the brake pedal, the first pad 31 and the second pad 32 are spaced apart from the disk as illustrated in FIG. 5.

In this state, when the user steps on the brake pedal, power is applied to the driving unit 10 and the driving gear 11 rotates.

As the driving gear 11 rotates, the differential gear unit 20 engaged with the driving gear 11 is also rotated.

In detail, the ring gear 21 engaged with the driven gear 11 is rotated, the differential case 22 integrally coupled to the ring gear 21 is rotated, and accordingly, the side gear 25, the differential pinion 26, the first shaft 23, the second shaft 24, and the first driven gear 27 are also rotated together.

Here, the first shaft 23 and the second shaft 24 are rotated in the same direction.

As the first shaft 23 is rotated, the first screw unit 42 coupled to the first shaft 23 is also rotated, and accordingly, the first nut unit 43 moves the first pad 31 in a direction toward the disk 30 to make the first pad 31 brought into contact with the disk 30, thus generating braking force, as illustrated in FIG. 6.

Namely, the first braking unit 40 has a length increased sufficient to make the first pad 31 clamped to the disk 30.

As the second shaft 24 rotates, the first driven gear 27 and the second driven gear 51 coupled to the second shaft 24 are rotated.

Also, as illustrated in FIG. 6, the second screw unit 52 coupled to the second driven gear 51 is rotated, and accordingly, the second nut unit 53 moves the second pad 32 in a direction toward the disk 30 to make the second pad 32 brought into contact with the disk 30, thus generating braking force.

Here, threads of the first screw unit 42 and the second screw unit 52 are formed in the same direction.

As the first driven gear 27 and the second driven gear 51 are engaged, the second screw unit 52 rotates in a direction opposite a direction of the first screw unit 42.

Thus, unlike the first braking unit 40, the second braking unit 50 is shortened in length, allowing the second pad 32 to be clamped to the disk 30.

Alternatively, a direction change gear (not shown) may be disposed between the first driven gear 27 and the second driven gear 51.

Here, the threads of first screw unit 42 and the second screw unit 52 may be formed in the opposite directions.

Also, the second screw unit 52 is rotated in a direction identical to that of the first screw unit 42 by the direction change gear disposed between the first driven gear 27 and the second driven gear 51.

Thus, even though the first screw unit 42 and the second screw unit 52 are rotated in the same direction, since the threads thereof are formed in the opposite directions, the second braking unit 50 is shortened in length, allowing the second pad 32 to be clamped to the disk 30, unlike the first braking unit 40.

Meanwhile, when any one of the first braking unit 40 and the second braking unit 50 are overloaded, greater rotational force is transmitted to the other braking unit.

Thus, braking force may substantially simultaneously be generated in the first braking unit and the second braking unit 50.

This is the function provided by the differential gear device, and in the present invention, the differential gear device is configured to prevent wear variations between the brake pads and obtain reliability of a response speed of a brake.

Thus, in the present invention, a single power source (motor) and the differential gear unit 20 are configured as a power transmission device, whereby the outer surface and the inner surface of the disk 30 are substantially simultaneously clamped to minimize wear variations between the first pad 31 (inner pad) and the second pad (outer pad) and breaking at the initial braking operation before the second pad 32 (outer pad) is clamped can be enhanced.

The EMB according to the present invention is not limited to the above-described embodiments, and may be corrected and modified within the technical scope obvious to those skilled in the art.

The EMB according to the present invention as described above has the following advantages.

Since the first pad (inner pad) and the second pad (outer pad) disposed on both sides of the disk are substantially simultaneously clamped to the disk by the driving unit and the differential gear unit, wear variations of both sides of the disk can be minimized and braking force and responsiveness in a braking operation can be enhanced.

Also, since the differential gear unit is configured as a power transmission source, when any one of the first braking unit and the second braking unit is first loaded, a greater amount of rotational force is transmitted to the other braking unit, whereby the first braking unit and the second braking unit can be substantially simultaneously driven together.

In addition, since the EMB is implemented with a relatively simple structure, excellent productivity and assembly characteristics can be obtained.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electro-mechanical brake (EMB) comprising:
   a driving unit configured to generate rotational force by power selectively applied as a user operates a brake pedal;
   a differential gear unit connected to the driving unit and including a first shaft and a second shaft disposed to be aligned to form rotational shafts and rotate in the same direction by rotational force from the driving unit;
   a first pad disposed on one side of a brake disk;
   a second pad disposed on the other side of the disk;
   a first braking unit connected to the first shaft in one end thereof and connected to the first pad in the other end thereof and configured to enable the first pad to be brought into contact with one side of the disk according to a rotation of the first shaft to generate braking force; and
   a second braking unit connected to the second shaft in one end thereof and connected to the second pad in the other end thereof and configured to enable the second pad to be brought into contact with the other side of the disk according to a rotation of the second shaft to generate braking force,
   wherein the first braking unit moves in a first plane and the second braking unit moves in a second plane different from the first plane,
   wherein the first braking unit is disposed in a direction parallel to the first shaft and varied in length in a length direction of the first shaft according to a rotation of the first shaft,
   wherein the second braking unit is disposed in a direction parallel to the second shaft and varied in length in a length direction of the second shaft according to a rotation of the second shaft,
   wherein the first braking unit, with a length increasing, moves the first pad in the direction toward the disk, and the second braking unit, with a length decreasing, moves the second pad in the direction toward the disk.

2. The electro-mechanical brake of claim 1, wherein the driving unit is configured as a driving motor having a driving gear coupled to a rotational shaft.

3. The electro-mechanical brake of claim 2, wherein the differential gear unit comprises:
   a ring gear rotated in mesh with the driving gear;
   a differential case coupled to one side of the ring gear and rotated together with the ring gear;
   the first shaft penetrating through the differential case;
   the second shaft penetrating through the ring gear and aligned with the first shaft;
   a pair of side gears disposed to face each other and coupled to one end of the first shaft and the other end of the second shaft, respectively, within the differential case; and
   a pair of differential pinions engaged with the pair of side gears perpendicularly and disposed to face each other within the differential case.

4. The electro-mechanical brake of claim 3, further comprising a first driven gear coupled to one end of the second shaft.

5. The electro-mechanical brake of claim 3, wherein when the driving motor rotates, the first shaft and the second shaft are rotated in the same direction according to rotations of the ring gear and the differential case.

6. The electro-mechanical brake of claim 1, wherein the first braking unit comprises:
   a first screw unit connected to the first shaft in one end thereof and having a thread formed on an outer circumferential surface of the other end thereof; and
   a first nut unit screw-coupled to the first screw unit and connected to the first pad,
   wherein the first pad coupled to the first nut unit linearly moves in a direction toward the disk according to a rotation of the first screw unit by the first shaft.

7. The electro-mechanical brake of claim 1, wherein the second braking unit comprises:
   a second driven gear engaged with the first driven gear coupled to the second shaft so as to be connected to the second shaft;
   a second screw unit coupled to the second driven gear in one end thereof and having a thread formed on an outer circumferential surface of the other end thereof; and
   a second nut unit screw-coupled to the second screw unit and connected to the second pad by a caliper,
   wherein the second pad coupled to the second nut unit linearly moves in a direction toward the disk according to a rotation of the second screw unit by the second shaft.

8. The electro-mechanical brake of claim 1, wherein the first pad and the second pad are simultaneously be brought into contact with the disk according to operations of the first braking unit and the second braking unit based on a rotation of the differential gear unit.

9. The electro-mechanical brake of claim 2, wherein the first pad and the second pad are simultaneously be brought into contact with the disk according to operations of the first braking unit and the second braking unit based on a rotation of the differential gear unit.

10. The electro-mechanical brake of claim 1, wherein the first pad and the second pad are simultaneously be brought into contact with the disk according to operations of the first braking unit and the second braking unit based on a rotation of the differential gear unit.

11. The electro-mechanical brake of claim 7, wherein the threads of the first screw unit and the second screw unit are formed in the same direction.

12. The electro-mechanical brake of claim 7, wherein a direction change gear is disposed between the first driven gear and the second driven gear, and the threads of the first screw unit and the second screw unit are formed in the opposite directions.

* * * * *